United States Patent [19]

Woinarski

[11] 4,227,623

[45] Oct. 14, 1980

[54] METHOD OF CONNECTING A BAIL TO A CONTAINER

[76] Inventor: Peter A. Woinarski, 162/C Queen St., Woollahra, Sydney, Australia 2025

[21] Appl. No.: 7,976

[22] Filed: Jan. 31, 1979

[30] Foreign Application Priority Data

Feb. 24, 1978 [AU] Australia ............... PD3504

[51] Int. Cl.³ .............. B65D 25/32; B65D 25/28
[52] U.S. Cl. ............................... 220/91; 220/92; 220/95
[58] Field of Search ........... 220/91, 92, 95; 150/48; 215/100 A

[56] References Cited

U.S. PATENT DOCUMENTS

| | | | |
|---|---|---|---|
| 3,093,257 | 6/1963 | Miller | 220/91 X |
| 3,158,284 | 11/1964 | Henchert et al. | 220/91 |
| 3,275,366 | 9/1966 | Hidding | 220/91 X |
| 3,302,826 | 2/1967 | Henchert et al. | 220/91 |

*Primary Examiner*—Steven M. Pollard
*Attorney, Agent, or Firm*—Kirschstein, Kirschstein, Ottinger & Cobrin

[57] ABSTRACT

A container having a pair of diametrically opposed bail ears, each of which is arranged to connect with a bail and each of which comprises a bearing portion, a flange portion and at least one limb. The bearing portion is arranged to provide a pivot bearing for the associated eye of the bail, the flange portion is arranged normally to prevent axial displacement of the eye onto or from the bail and the or each limb has a free end that is resiliently deformable between an unstressed first position and a stressed second position. Axial displacement of the eye of the bail is accommodated when the free end of the or each limb is deformed into the second position.

4 Claims, 16 Drawing Figures

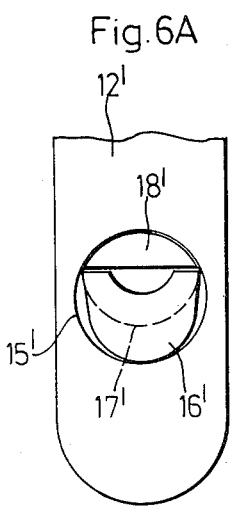 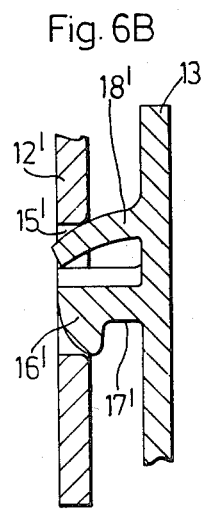 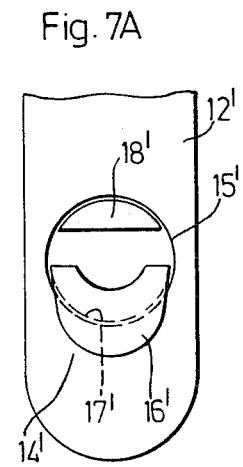 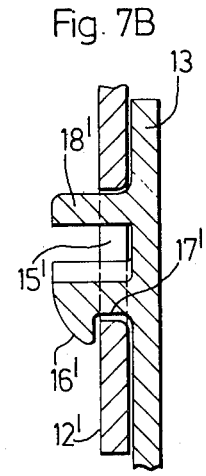
Fig. 6A    Fig. 6B    Fig. 7A    Fig. 7B
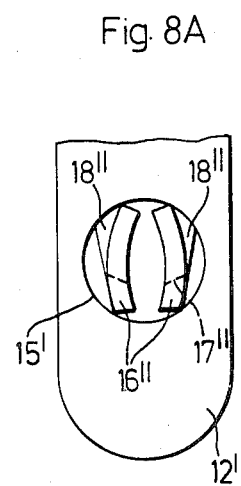 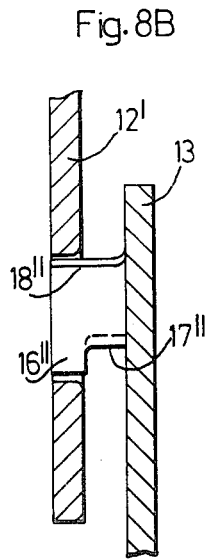 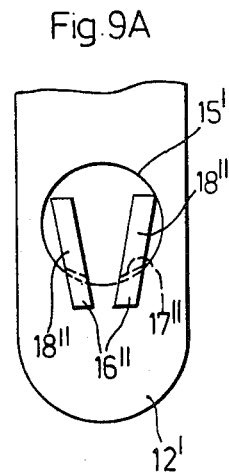 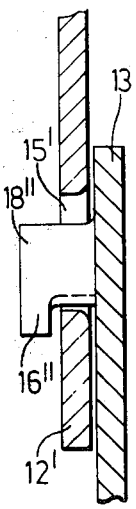
Fig. 8A    Fig. 8B    Fig. 9A    Fig. 9B

METHOD OF CONNECTING A BAIL TO A CONTAINER

FIELD OF THE INVENTION

This invention relates in general terms to an arrangement for connecting a bail to a container and, more specifically, to a bail ear formed as a part of a plastics material container. In the context of the present invention, a bail is a pivotable handle for a container and a bail ear is a part of the wall of the container to which the bail is, in use, pivotably connected.

BACKGROUND OF THE INVENTION

A number of different methods are currently employed for connecting a bail to a plastics material container, without the end portions of the bail entering the container or being simply threaded through a peripheral flange of the container. One method involves forming the external wall of the container with diametrically disposed apertured cups or hollow embossments and by forcing or manipulating bent end portions of the bail into the cups. A second method involves forming diametrically disposed mushroom-shaped projections or buttons on the external wall of the container, just below its rim, and by fitting an eye portion at each end of the bail onto the respective projections. Such fitting involves either crimping the ends of the bail around the associated projections or by forcing preformed eyes onto the projections. Whichever of these methods is employed, considerable effort is required to fit the bail to the container and/or to remove the bail from the container.

OBJECT OF THE INVENTION

The present invention seeks to provide an arrangement for fitting a bail to a container and which facilitates relatively convenient connection of the bail to the container.

SUMMARY OF THE INVENTION

The present invention provides a container which is formed from a deformable plastics material and which has a pair of diametrically opposed bail ears to which a bail can be fitted. Each bail ear comprises, (a) a bearing portion which projects outwardly from the container wall and which provides a pivot bearing for an eye of the bail, (b) at least one flange portion which is formed integrally with the bearing portion, the or each flange portion being spaced from the container wall by the bearing portion and being arranged normally to prevent axial displacement of the eye of the bail onto or from the bearing portion, and (c) at least one limb which projects outwardly from the container wall, the or each limb having a free end that is resiliently deformable between an unstressed first position and a stressed second position.

The or each limb is engageable with the eye of the bail when the bail is fitted to the bearing portion and the free end of the limb is in the first position. Also, axial displacement of the eye of the bail past the flange portion is facilitated when the free end of the limb is in the second position.

The present invention further provides a container as above defined when fitted with a bail having an eye forming each end portion thereof or formed in each of the end portions. The bail may comprise a wire-type bail having its respective ends looped to form the eyes or it may comprise a strap-form bail having apertures constituting the eyes formed in the end portions thereof.

The invention will be more fully understood from the following description of various exemplary embodiments of the invention. The description is given with reference to the accompanying non-limiting drawings.

BRIEF DESCRIPTION OF THE DRAWINGS

In the drawings:

FIGS. 7A and 7B show views that are similar to those of FIGS. 6A and 6B respectively, but with the bail end completely fitted to the bail ear, FIGS. 8A and 8B show end elevation and sectional side-elevation views respectively of a further modified type of bail ear configuration, with a strap-type bail being shown in the process of being fitted to the bail ear, and FIGS. 9A and 9B show views that are similar to those of FIGS. 8A and 8B respectively, but with the bail end completely fitted to the bail ear.

Figure 1:
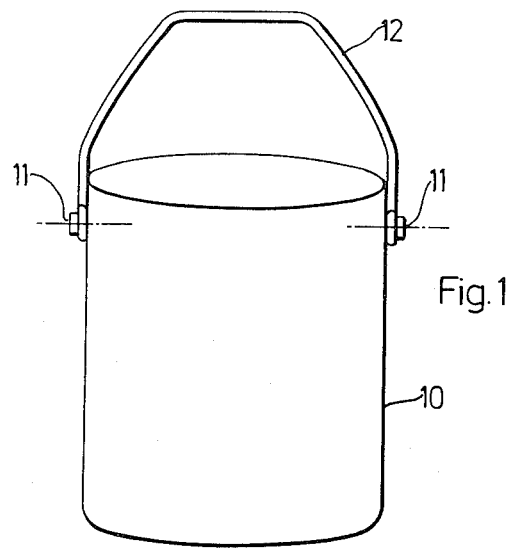
FIG. 1 shows a perspective view of open-topped container which is formed with integral bail ears and which includes a pivotable bail.

DETAILED DESCRIPTION OF THE INVENTION:

Referring to the drawings, FIG. 1 shows a container 10 which would in practice be formed of a deformable plastics material and which includes two diametrically disposed bail ears 11. Although a cylindrical form lidless container is shown, it is to be understood that the present invention is applicable to containers having any configuration, including containers incorporating or having provision for a closure. A bail 12 is removably fitted to the container by way of the bail ears 11.

Figure 2:
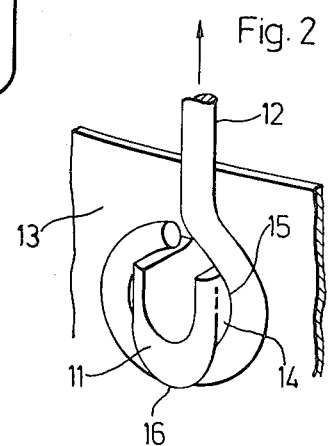
FIG. 2 shows, in perspective, a scrap view of an external wall of the container, including one of the bail ears and a bail end-portion connected thereto.

As is most clearly shown in FIG. 2, each bail ear 11 is formed (i.e. moulded) integrally with the external wall 13 of the container. The bail ear may take various configurations, three of which are shown by way of example in the drawings.

Figure 3A:
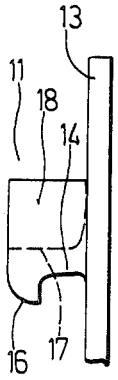
FIGS. 3A and 3B show side and end elevation views respectively of the bail ear, without the bail end-portion being connected thereto.
Figure 3B:
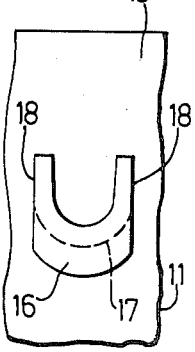
Figure 4A:
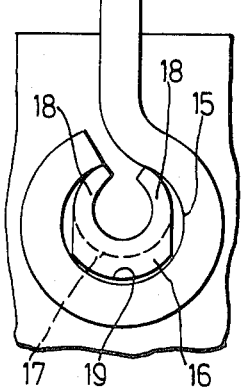
FIG. 4A shows an end elevation view of the bail ear with the bail end-portion in the process of being fitted to the bail ear.
Figure 4B:
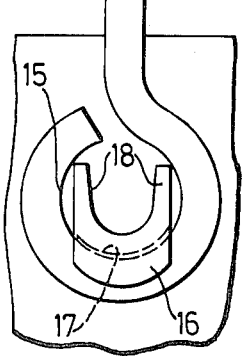
FIG. 4B shows a view similar to that of 4A but with the bail end-portion fully fitted to the bail ear.

As shown in FIGS. 2, 3 and 4, the bail ear 11 comprises a bearing portion 14 which provides a pivot bearing for an eye portion 15 of the bail, and a flange portion 16 which is spaced from the container wall by the bearing portion 14. The bearing portion 14 is generally U- shaped in end elevation (see FIG. 3B), having an arcuate lower surface 17 and two limbs 18. When the bail ear is in a relaxed (i.e. undeformed) condition, the arcuate surface 17 and the upper, outer corners of the limbs 18 lie on a common (imaginary) circle having a radius centre co-axial with the bail eye 15. This is best shown in FIG. 4B which shows the bail eye extending around the arcuate surface 17 and just contacting the extremities of the limbs 18.

The flange portion 16 of the bail ear extends below the level of the arcuate surface 17 and acts normally to prevent the bail eye 15 from displacing axially with respect to the bearing portion 14. However, as is shown in FIG. 4A, the outer (free) end portions of the limbs 18 may be deformed (relying on the inherent resiliency of the container material) to lie on a second imaginary circle having a centre subtending the peripheral surface 19 of the flange 16. By so deforming the limb portions 18 of the bail ear, the bail may be fitted to or be removed from the container.

When the bail eye has been fitted to the bail ear, as shown in FIGS. 2 and 4B, and a normal lifting force is applied to the bail, as shown by the arrow in FIG. 2, the bail will not tend to break loose from the ear. This is because the lifting force is transmitted to the wall 13 of the container by way of the arcuate surface 17 and the limbs 18 of the ear. The arcuate face 17 is constrained against significant deformation by the inner ends of the limbs 18 being joined to the container wall. Thus, the bail ear 11 may only be deformed, to permit removal of the bail, by forcing the eye 15 downwardly (i.e. laterally with respect to the ear axis) onto the upper extremity of the limbs 18 and by then moving the eye outwardly (i.e. axially) past the flange 16.

Fitting of the bail 12 to the bail ear 11 is relatively easy but, as is desired, removal of the bail from the ear is more difficult. This is because the outer, free, end of each of the limbs 18 can be deformed, during fitting of the bail, to a greater extent than the inner end of each limb which is directly connected to the container wall. During removal of the bail from the ear it is the inner end of each limb which initially must be deformed, this requiring a greater deforming force.

Figures 5A, 5B:
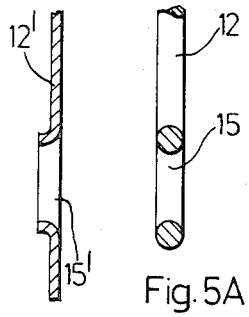
FIG. 5A shows a sectional side-elevational view of an end portion of a bail of the type shown in FIGS. 1 to 4 of the drawings.
FIG. 5B shows a sectional side-elevational view of an end portion of an alternative, strap-type, bail for fitting to the container as shown in FIG. 1, FIGS. 6A and 6B show end elevation and sectional side-elevation views respectively of a modified bail ear configuration, the figures showing a strap-type bail being fitted to the bail ear.

The bail 12 as above referred to is shown formed from a wire of circular cross-section. However, as is shown in FIGS. 5B 6 and 7, the bail may be constituted by a strap 12' having an aperture 15' in its respective end portions. The aperture in this case is preferably formed by swaging so as to provide a significant contact surface for pivoting about the bearing surface of the bail ear 11. The bail shown in FIG. 5B may be employed in conjunction with the bail ear configuration as shown in FIGS. 2 to 4 or, as shown in the drawings, in conjunction with the bail ear configuration as illustrated in FIGS. 6 to 9. Similarly, the strap-type bail of FIG. 5B may be used in conjunction with the bail ear configuration as shown in FIGS. 2 to 4.

The bail ear as shown in FIGS. 6A,B and 7A,B is similar to that above described, in that it includes a bearing portion 14' having an arcuate support surface 17' and a flange 16'. However instead of being U-shaped and having two deformable limbs, a separate limb portion 18' is provided. The limb portion 18' is generally D-shaped in section and it projects outwardly from the container wall 13.

When in a relaxed (undeformed) state, as shown in FIGS. 7A and 7B, the limb 18' has an outer surface which is arcuate in shape and which lies on the same imaginary circle as the arcuate surface 17'. When in this condition, the bail eye 15' is held captive to the bail ear by the flange portion 16' However, when the limb 18' is deformed downwardly as shown in FIGS. 6A and 6B, the outer surface of the limb (at the free end thereof) forms an imaginary circle with lower edge of the flange 16'. Thus, the bail eye 15' can be moved laterally (downwardly) with respect to the axis of the ear and then moved in the axial direction of the ear to clear the flange 16'. This procedure is similar to that applicable to the arrangement shown in FIGS. 4A and 4B, the limb 18' being deformable (again relying on the inherent resiliency of the material) in much the same way and for the same purpose as the limbs 18 as shown in FIGS. 4A and 4B.

A similar concept applies in respect of the arrangement that is shown in FIGS. 8A,B and 9A,B. In this case a bail ear is shown that is analogous to that which is illustrated in FIG. 2, but the limb portions 18" are not bridged to form a U-shaped configuration. Thus, two flanges 16" are provided and each flange forms an extension of an associated limb 18". The flanges 16" project downwardly beyond bearing surface portions 17" of the ear, and the flanges 16" are spaced outwardly from the wall 13 of the container by the bearing surface portions.

As is shown in FIGS. 8A and 8B, when the bail 12' is being fitted to the ear, the free outer ends of the limb portions 18" are deformed toward one another so as to lie on an imaginary circle that encompasses the extremities of the flanges 16". This condition is best illustrated in FIG. 8A, and when the limbs have been so deformed the eye 15' of the bail may be forced over the flanges 16" to engage with the bearing surface portions 17".

Thereafter, when the free outer ends of the limbs 18" return to their unstressed position, as best illustrated in FIG. 9A, those ends of the limbs lie on an imaginary circle that encompasses the bearing portions 17" of the bail ear.

I claim:

1. A container formed from a deformable plastics material and having a pair of diametrically opposed bail ears to which a bail can be fitted, each bail ear comprising:
   (a) a bearing portion which projects outwardly from a wall of the container and which provides a pivot bearing for an eye of the bail,
   (b) at least one flange portion which is formed integrally with the bearing portion, the flange portion being spaced from the container wall by the bearing portion and being arranged normally to prevent axial displacement of the eye of the bail relative to the bearing portion, and
   (c) two limbs which project outwardly from the container wall, the bearing portion and the two limbs forming a U-shaped element that projects outwardly from the container wall with the bearing portion being constituted by an arcuate part of the U-shaped element, each limb having a free end that is resiliently deformable relative to the bearing portion between an unstressed first position and a stressed second position, each limb being engageable with the eye of the bail when the bail is fitted to the bearing portion and the free end of the limb is in the first position, and axial displacement of the eye of the bail past the flange portion being accommodated when the free end of each limb is in its second position.

2. A container as claimed in claim 1, wherein the flange incorporates an arcuate periphery which projects below the arcuate part of the U-shaped element and which has a radius centre which is located below the radius centre of the arcuate part of the U-shaped element, wherein the free ends of the limbs when in the first position lie on an imaginary circle of which the arcuate part of the U-shaped element forms a part, and wherein the free ends of the limbs when in the second position lie on an imaginary circle of which the flange's arcuate periphery forms a part.

3. A container formed from a deformable plastics material and having a pair of diametrically opposed bail ears to which a bail can be fitted, each bail ear comprising:
(a) two limbs which project outwardly from the container wall, the limbs being constituted by separate rectilinear projections which subtend an acute angle between themselves,
(b) a bearing portion which projects outwardly from the wall of the container and which provides a pivot bearing for an eye of the bail, the bearing portion being constituted by a recess which is formed in a lower margin of each of the limbs, and
(c) a flange portion constituted by a downwardly projecting portion of each of the limbs, the downwardly projecting portion of each limb being separated from the container wall by the recess, each limb having a free end that is resiliently deformable relative to the bearing portion between an unstressed first position and a stressed second position, each limb being engageable with the eye of the bail when the bail is fitted to the bearing portion and the free end of the limb is in the first position, and axial displacement of the eye of the bail past the flange portion being accommodated when the free end of each limb is in the second position.

4. A container as claimed in claims 1 or 3 when fitted with a bail, the bail being formed in respective ends thereof with a bail eye which is removably fitted to the respective bail ears.

* * * * *